United States Patent [19]

Sandell

[11] 4,011,096

[45] Mar. 8, 1977

[54] VESICULATED SILICA MICROSPHERES

[75] Inventor: Lionel Samuel Sandell, Claymont, Del.

[73] Assignee: E. I. Du Pont de Nemours and Company, Wilmington, Del.

[22] Filed: June 10, 1975

[21] Appl. No.: 585,590

[52] U.S. Cl. .......................... 106/288 B; 423/335; 423/338; 106/293; 106/296; 106/297; 106/299; 106/300; 106/307; 252/448; 252/449

[51] Int. Cl.² ........................................ C04B 31/00

[58] Field of Search ............... 106/288 B, 291, 293, 106/296, 297, 299, 300, 307; 252/451, 449, 446, 448; 423/338, 335

[56] References Cited

UNITED STATES PATENTS

| 2,384,946 | 9/1945 | Marisic | 252/451 X |
| 2,528,767 | 11/1950 | Marisic | 252/448 |
| 2,697,066 | 12/1954 | Sieg | 252/451 |
| 2,757,073 | 7/1956 | Drexel | 423/338 |
| 3,301,635 | 1/1967 | Bergn et al. | 423/335 |
| 3,848,059 | 11/1974 | Erneta | 423/327 |
| 3,855,172 | 12/1974 | Iler et al. | 106/288 B |
| 3,857,924 | 12/1974 | Halasz et al. | 423/338 |

*Primary Examiner*—Patrick P. Garvin
*Assistant Examiner*—John P. Sheehan

[57] ABSTRACT

Vesiculated silica microspheres having an average diameter from $0.5\mu$ to $50\mu$, a maximum vesicle diameter less than $50\mu$ and a volume of vesicles from 5 to 95% of the total volume of the microspheres, produced by acidifying an oil-in-water-in-oil emulsion prepared by a double emulsion technique. The vesiculated silica microspheres are particularly useful as opacifying agents for coating compositions and as fillers for paper.

12 Claims, 1 Drawing Figure

VESICULATED SILICA MICROSPHERES

BACKGROUND OF THE INVENTION

This invention relates to vesiculated silica microspheres which are useful as opacifying agents for coating compositions such as latex paints and especially useful as opacifiers and fillers for fibrous substrates such as paper.

A wide variety of porous silica particles are known in the art. The porous silica particles are commonly designed for use as catalysts or catalyst supports and less commonly for use as molding powders and insulating materials. Porous silica particles used as catalysts or catalyst supports are generally relatively large spherical particles, referred to as "beads", containing typical geltype pores having a maximum diameter of less than about $0.01\mu$. Porous silica particles of this type have been prepared by acidifying an aqueous solution of sodium silicate to form a silica gel, then agitating the gel in an oil at elevated temperatures to form silica "beads" or spherical silica particles, as described, for example, in U.S. Pat. No. 2,528,767. Molding powders composed of porous silica microspheres having a diameter in the range of $0.1\mu$ to $50\mu$ have been made by spray drying sols containing colloidal silica, as described in U.S. Pat. No.3,301,635. The microspheres produced by this process are nonuniform aggregates of colloidal silica particles having very small pores, i.e., less than $0.01\mu$ in diameter. The small pores present in the silica particles described above are too small for effective light scattering and render such silica particles relatively useless as opacifying agents.

Hollow silica spheres having an average diameter from $100\mu$ to $2500\mu$, useful as insulating materials, have been made by suspending particles of alkali metal silicate and a metal oxide with a compound which liberates a gas at elevated temperatures and heating the particles to 1000°–2500° F. (540°–1371° C.). The hollow silica spheres produced by this process are generally clear and transparent, rather than opaque, because the large air cell within the hollow sphere is too large to scatter light effectively.

A method for producing reticulated inorganic microparticles useful as pigment is described in U.S. Pat. No. 3,848,059. This process comprises mixing two separate water-in-oil emulsions, each containing a separate inorganic salt to form spherical shaped microparticles of an insoluble salt having an average particle size which falls within the range of $0.1\mu$ to $5.0\mu$. The degree of porosity for these spherical microparticles is insufficient for use as highly effective opacifying agents.

Generally, the porous silica microparticles formed by the processes of the prior art are either large hollow microspheres or very dense microparticles which lack sufficient opacity for use in many applications.

The vesiculated silica microspheres of the invention have the size and porosity needed for high performance opacifiers and fillers.

SUMMARY OF THE INVENTION

This invention provides for vesiculated silica microspheres containing from 0 to 90% by weight of pigment based on the total weight of the microspheres, the microspheres having an average diameter from $0.5\mu$ to $50\mu$, the maximum diameter of the vesicles being less than $50\mu$ and the volume of the vesicles being from 5 to 95% of the microspheres. The vesiculated silica microspheres are substantially spheroidal and, preferably, have a substantially smooth, continuous surface. The average diameter of the microspheres is preferably less than $50\mu$, e.g., when used as a paper filler, and less than $25\mu$, e.g., when used as an opacifying agent in paint.

The microspheres contain at least one and preferably a plurality of vesicles. The vesicles exist primarily in the form of discrete, substantially spheroidal bubbles which are distributed throughout the silica microsphere and defined by the continuous silica component of the microsphere. The average diameter of the vesicles can range from $0.1\mu$ to less than $50\mu$, and preferably from $0.1\mu$ to $1.0\mu$. The total volume of the vesicles is preferably from 10 to 80% of the total volume of the microsphere. The vesicles are preferably completely enclosed within the microsphere, i.e., are encased in a substantially continuous shell.

The vesiculated silica microspheres can contain up to 90% by weight of pigment, which can be present inside the vesicles, within the silica component of the microsphere, or throughout the entire microsphere. A wide variety of organic and inorganic pigments may be present in the microspheres. Among the common organic pigments which may be present are copper phthalocyanines and quinacridone. For opacifying applications, it is highly advantageous to provide a substantial proportion of an inorganic pigment in the granules. Although clay, calcium carbonate, white lead, zinc oxide, zinc sulfide, carbon black and various types of metal oxides and other inorganic materials can be used, titanium dioxide is preferred. The amount of such inorganic pigment can be varied widely but in general the microspheres should preferably contain about 20 to 80% by weight of inorganic pigment, based on the total weight of the microspheres, to achieve optimum opacity effects.

The vesiculated silica microspheres are prepared by the steps of i. forming an oil-in-water emulsion by contacting a siliceous aqueous phase with a first oil phase, said siliceous aqueous phase composed of water and at least one silicon compound selected from the group consisting of colloidal silica and alkali metal silicates, said first oil phase composed of at least one water-immiscible hydrocarbon selected from the group consisting of liquid and low melting aliphatic and aromatic hydrocarbons, distributed in at least one of said phases is at least one oil-in-water emulsifying agent, ii. forming an oil-in-water-in-oil emulsion by contacting the oil-in-water emulsion formed in Step (i) with a second oil phase, said second oil phase composed of a nonionic water-in-oil emulsifying agent and at least one waterimmiscible hydrocarbon selected from the group consisting of aliphatic, aromatic and chlorinated hydrocarbons, iii. adding an acid to the oil-in-water-in-oil emulsion formed in Step (ii), said acid being added in an amount from 0.5 to 2.0 times the amount of said acid needed to react stoichiometrically with the total amount of base present in the siliceous aqueous phase of Step (i) to gel the siliceous aqueous phase and form a slurry of vesiculated silica microspheres, and iv. separating the vesiculated silica microspheres from the slurry formed in Step (iii). To insure that the microspheres are freed from any residual oil from the second oil phase on the surface of the microspheres, the separated microspheres of Step (iv) can be v. dispersed in an aqueous or alcoholic solution of a hydrophilic surfactant, vi. separated from the solution of surfactant, and vii. washed with water or alcohol. By dispersing the microspheres in an aqueous or alcoholic solution of a hydrophilic surfactant in accordance with Step (v), any residual oil on the surface of the microspheres is dispersed in the surfactant solution which is then separated from the microspheres by Step (vi) by conventional techniques such as filtration. Washing the microspheres with water or alcohol in accordance with Step (vii) insures the removal of any residual surfactant or salts formed during processing which may remain on the surface of the microspheres.

For optimum effectiveness as an opacifying agent the vesiculated silica microspheres should be activated, i.e., the first oil phase present within the vesicles should be removed leaving the vesicles essentially gaseous. Prior to use in a coating composition or filler, the microspheres can be activated rapidly by heating or slowly by allowing the microspheres to dry at room temperature for a sufficient length of time. The activation can be considered complete when the microspheres appear substantially opaque on microscopic examination. The appearance of opacity in the activated microspheres indicates the presence of a majority of vesicles having a diameter of less than about $1\mu$, and particularly in the range of $0.1\mu$ to $1.0\mu$, which provides increased light scattering efficiency and, therefore, opacity. The activation process may occur after the microspheres are incorporated in an end use system, e.g., a paint vehicle or a fibrous substrate, by drying after application of the composition containing the microspheres to a substrate.

DETAILED DESCRIPTION OF THE INVENTION

Figure 1:
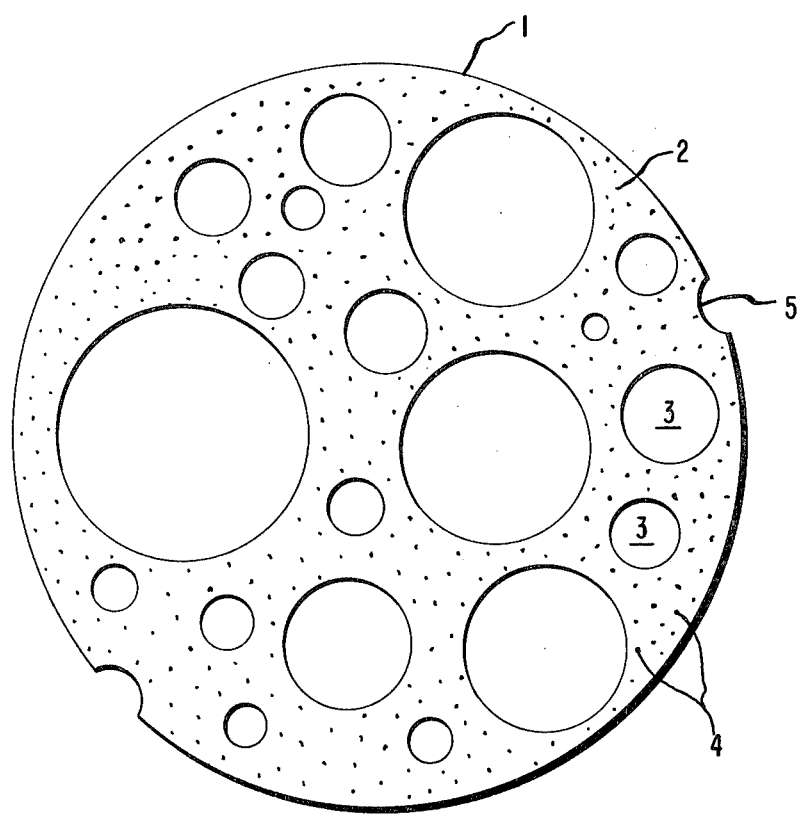
FIG. 1 shows a schematic cross-sectional view of a typical single vesiculated silica microsphere of the invention.

Referring to FIG. 1, a typical vesiculated silica microsphere of the invention, 1, is substantially spherical and has a diameter from $0.5\mu$ to $50\mu$. The microsphere is composed of a silica gel or matrix, 2, which defines at least one and preferably a plurality of discrete vesicles, 3, which have an average diameter of at least $0.1\mu$ to less than $50\mu$, and preferably from $0.1\mu$ to $1.0\mu$. The silica gel or matrix, 2, is characteristic of gels generally in that the silica gel contains numerous small pores, 4, having a maximum diameter of less than about $0.01\mu$. These pores are not to be confused with the vesicles, 3, defined by the silica gel or matrix, as the pores are generally at least an order of magnitude smaller and are too small to effectively scatter light and opacify the microsphere. For optimum opacity, the microsphere surface should be substantially continuous, i.e., most of the vesicles should be completely enclosed in the silica gel or matrix. However, if some vesicles, 5, are not completely enclosed, the properties of the microsphere are not adversely affected.

The vesiculated silica microspheres can be prepared by forming an oil-in-water emulsion by mixing a silaceous aqueous phase and a first oil phase, then forming an oil-in-water-in-oil emulsion by mixing the oil-in-water emulsion with a second oil phase, after which the silica is gelled by contact with acid.

The siliceous aqueous phase preferably contains from 5 to 40% by weight of silica, calculated as $SiO_2$ and based on the total weight of the siliceous aqueous phase. The source of silica can be alkali metal silicates such as sodium silicate or colloidal silica. Sodium silicates with a $SiO_2:Na_2O$ weight ratio from about 2:1 to 4:1 are preferred. For example, when utilizing a 38% by weight solution of sodium silicate having a 3.25:1 $SiO_2:Na_2O$ weight ratio, it is preferred that one volume of the 38% solution be diluted with 3 or 4 volumes of water prior to use.

The first oil phase should contain at least one water-immiscible hydrocarbon selected from liquid and low melting aliphatic and aromatic hydrocarbons, e.g., cyclohexane, hexane, heptane, mineral spirits, paraffinic solvents, kerosene, benzene, toluene, xylene and the like.

At least one oil-in-water emulsifying agent should be present in at least one of the siliceous aqueous phase and first oil phase. It is preferred that an oil-in-water emulsifying agent be present in each phase for best results. The emulsifying agent in the first oil phase usually generates oil droplets of less than $2\mu$ in diameter while the emulsifying agent in the siliceous aqueous phase stabilizes the oil-in-water emulsion and prevents breaking during further processing, e.g., during the formation of the oil-in-water-in-oil emulsion. In either phase the oil-in-water emulsifying agent should preferably be of the nonionic type in order not to induce premature precipitation of silica. In particular, nonionic oil-in-water emulsifying agents such as ethoxylated alcohols containing long polyoxyethylene chains are especially suitable for stabilizing oil droplets in the silaceous phase. Oil-in-water emulsifying agents such as ethoxylated alcohols and hydrophilic fatty acid esters are particularly useful in the first oil phase. The amount of oil-in-water emulsify-ing agent can be from 1 to 15% by weight, based on the total weight of the phase in which it is present, i.e., the siliceous aqueous phase or the first oil phase.

If pigmented vesiculated silica microspheres are desired, from 1 to 100% by weight of a pigment, based on the weight of the aqueous or oil phase without pigment, can be added to the siliceous aqueous phase or the first oil phase or both, prior to forming the oil-in-water emulsion. A wide variety of organic pigments, e.g., copper phthalocyanines and quinacridones, and inorganic pigments, e.g., titanium dioxide, clay, calcium carbonate, white lead, zinc oxide, zinc sulfide, carbon black, etc., can be used. For microspheres of high opacity inorganic pigments are preferred. Anatase or rutile titanium dioxide is especially suitable.

In forming the oil-in-water emulsion, the ratio of the total volume of the first oil phase to the total volume of the siliceous aqueous phase should preferably be from 1:10 to 1:1.

The second oil phase should contain at least one water-immiscible hydrocarbon selected from liquid aliphatic, aromatic and chlorinated hydrocarbons, e.g., cyclohexane, hexane, mineral spirits, benzene, xylene, chloroform, carbon tetrachloride, and the like. If desired, mixtures of aliphatic and chlorinated hydrocarbons may be employed to control the density of the second oil phase for improved emulsification. The second oil phase should also contain from 0.5 to 15% by weight of a nonionic water-in-oil emulsifier such as lyophilic fatty acid esters, ethoxylated alcohols and glycerides to insure the formation of appropriately sized water-in-oil emulsion droplets.

In forming the oil-in-water-in-oil emulsion the ratio of the total volume of the oil-in-water emulsion to the total volume of the second oil phase should preferably be from 1:6 to 1:1.

To gel the silica in the siliceous aqueous phase of the oil-in-water-in-oil emulsion, acid is added to the emulsion in an amount from 0.5 to 2.0 times the amount needed to react stoichiometrically with the total amount of base present in the siliceous aqueous phase. A large excess of acid is not recommended, since the presence of excess acid tends to break the oil-in-water-in-oil emulsion. The acid is preferably oil- and water-miscible, such as glacial acetic acid, trichloroacetic acid, chloroacetic acid, formic acid and oxalic acid.

After separating the microspheres from the reaction media, the microspheres should preferably be washed free of any residual oil from the second oil phase which may remain on the surface of the microsphere. An aqueous or alcoholic solution of a surfactant such as a highly hydrophilic fatty acid ester is recommended. The microspheres can then be used in coating compositions without further processing or can be dried prior to use.

The microspheres of the invention are particularly useful as high performance opacifying agents in surface coatings, such as latex paints. In such an application, it is desirable that the microspheres be pigmented, preferably with titanium dioxide. The microspheres may be added dry, or preferably as an aqueous wetcake to a preformulated aqueous latex emulsion. For example, from 30 to 70% by volume of microspheres, based on the total volume of solids in the paint composition, may be mixed with a typical starting-paint or masterbatch emulsion formulated at about 34 PVC (pigment volume concentration) and containing about 3 lb./gal. (0.36 kilogram/liter) of $TiO_2$ with little or no extender.

The microspheres of the invention are also useful as an opacifying agent and filler for fibrous substrates such as paper. In the paper industry, fillers such as $TiO_2$, clay or calcium carbonate are added to the paper finish prior to formation of the fibrous web on the papermaking machine. Since these fillers generally contain particles of less than $1\mu$ in diameter, a substantial portion of the filler passes through the fibrous web and remains in the whitewater. The microspheres of the invention have higher retention than the common fillers because of their larger particle size and at the same time provide high opacity.

In the unpigmented state, the microspheres of the invention have high brightness and are more opaque than fillers such as clay. The opacity of the microspheres is further increased by incorporating inorganic pigment such as $TiO_2$ and because of higher retention the pigmented microspheres are more efficient than $TiO_2$ alone on paper. A further advantage of the microspheres is their light weight, both in the pigmented and unpigmented state. The density of the microspheres is substantially lower than conventional filler pigments, and consequently the microspheres are particularly useful for producing light weight paper with high opacity.

The following examples illustrate the invention.

EXAMPLE 1

One volume of a 38% by weight solution of sodium silicate ($SiO_2/Na_2O = 3.25$, Du Pont Technical Grade No. 9) is diluted with four volumes of water. A siliceous aqueous phase is then prepared by mixing 2.5 ml of an octylphenoxy polyethoxyethanol (a nonionic oil-in-water emulsifying agent sold by Rohm & Haas under the name Triton X-405) and 30 ml. of the previously-prepared diluted solution of sodium silicate. A first oil phase is prepared by mixing 5 ml. of an ethoxylated alcohol (a nonionic oil-in-water emulsifying agent sold by Du Pont under the name Merpol SH) in 25 ml. of cyclohexane in a four-ounce wide mouth jar. The first oil phase is then stirred by attaching the four-ounce wide mouth jar to a conventional mixing apparatus, i.e., a Chemapec model E1 vibromixer fitted with a 45 mm stirrer disc.

The oil-in-water emulsion is prepared by slowly adding the above-prepared siliceous aqueous phase to the first oil phase with stirring. After complete addition of the siliceous aqueous phase, stirring is continued for five minutes. A brilliant white oil-in-water emulsion is formed containing oil droplets having an approximate average diameter of less than $2\mu$.

To form an oil-in-water-in-oil emulsion, 10 ml of the above-prepared oil-in-water emulsion is mixed with 30 ml of a second oil phase consisting of two volumes of cyclohexane, three volumes of carbon tetrachloride and 0.5 volume of sorbitan monooleate (a nonionic water-in-oil emulsifying agent sold by ICI America under the name Span 80), in a four-ounce wide mouth jar. The mixture is stirred for one minute by the conventional mixing apparatus described above.

While stirring is continued, a mixture consisting of 30 ml. of the second oil phase described above and 0.25 ml. of glacial acetic acid are added to the oil-in-water-in-oil emulsion prepared above to form an oil slurry of the silica microspheres. Stirring is continued for four minutes after addition is complete.

The silica microspheres are separated from the oil phase by centrifugation. The microspheres are then mixed with a 50% by volume aqueous solution of a hydrophilic fatty acid ester (a nonionic oil-in-water emulsifying agent sold by ICI Inc. under the name Tween 20) and separated from the aqueous solution by centrifugation and the supernatant liquid discarded. The microspheres are then washed by repeated centrifugation in water to a specific resistance of at least 20,000 ohm-cm.

In the first wash water the microsphere suspension has a pH of 5.1. Examination of a drop of the aqueous suspension with a light microscope shows discrete spherical microspheres averaging about $10\mu$ in diameter. A drop of the aqueous suspension is placed on a glass slide and heated on a hot plate over low heat for a few minutes to remove the liquid entrained in the vesicles. The microspheres are examined under a microscope and found to be predominately opaque, indicating the presence of vesicles from $0.1\mu$ to $1\mu$ in diameter. Examination of the microspheres by scanning electron microscopy reveals uniform spheres with generally smooth surfaces and occasional small surface irregularities. A fractured sample of the microspheres shows vesicles with an average diameter of about $1\mu$.

EXAMPLE 2

The procedure of Example 1 is followed except that the first oil phase consists of 25 ml of a commercially available paraffinic solvent, b.p. about 190° C. (sold by Exxon Corp. under the name Exxon Low Odor Paraffinic Solvent) and four milliliters of the oil-in-water emulsifying agent described in Example 1.

The resulting vesiculated silica microspheres have an average diameter of about $15\mu$ and become opaque upon heating indicating the presence of vesicles from $0.1\mu$ to $1\mu$ in diameter.

EXAMPLE 3

The procedure of Example 2 is followed except that the second oil phase consists of one volume of xylene and 0.1 volume of the water-in-oil emulsifying agent described in Example 1.

The resulting vesiculated silica microspheres have an average diameter of about $10\mu$ and become partially opaque upon heating.

EXAMPLE 4

The procedure of Example 2 is followed except that 3 ml of the octylphenoxy polyethoxy ethanol is present in the aqueous phase. The first oil phase consists of 25 ml of the paraffinic solvent and 5 ml of the oil-in-water emulsifying agent and the second oil phase consists of 30 ml of mineral spirits containing 1% by volume of the water-in-oil emulsifying agent described in Example 1.

The resulting vesiculated silica microspheres have an average diameter of $15\mu$ and slightly irregular surfaces. The microspheres become partially opaque upon heating.

EXAMPLE 5

The procedure of Example 2 is followed except that the starting solution of sodium silicate consists of one volume of the sodium silicate solution described in Example 1 and three volumes of water and 0.3 ml of glacial acetic acid is added to the oil-in-water-in-oil emulsion.

The resulting vesiculated silica microspheres have an average diameter of about $35\mu$. The microspheres become opaque upon heating.

EXAMPLE 6

The procedure of Example 1 is followed except that the siliceous aqueous phase is formed from the solution of sodium silicate diluted with three volumes of water, the first oil phase contains paraffinic solvent described in Example 2 and 4 ml. of emulsifier, and the second oil phase is mineral spirits with 10% by volume of emulsifier.

Examination of the microspheres by scanning electron microscopy reveals small microspheres of about $3\mu$ in diameter having smooth, continuous surfaces. A fractured sample of the microspheres shows vesicles with a diameter of less than $1\mu$.

EXAMPLE 7

The procedure of Example 2 is followed except that the siliceous aqueous phase is prepared using a 43% by weight solution of sodium silicate ($SiO_2/Na_2O = 2.87$, Du Pont Technical Grade No. 14).

When analyzed as in Example 1 the microspheres are found to be uniformly vesiculated and have an average diameter of about $8\mu$. The opacity of the microspheres upon heating indicates the presence of vesicles from $0.1\mu$ to $1.0\mu$ in diameter.

EXAMPLE 8

One volume of an aqueous colloidal silica sol containing 49% by weight of silica ($SiO_2/Na_2O = 235$) is diluted with one volume of water. In the manner described in Example 1 30 ml of the resulting mixture containing 0.5 ml. of the octylphenoxy polyethoxy ethanol described in Example 1 is mixed with 20 ml. of cyclohexane containing 3 ml. of the ethoxylated alcohol described in Example 1. Then 10 ml. of a siliceous aqueous phase, prepared as described in Example 1 but omitting the emulsifying agent, is stirred into 40 ml. of the oil-in-water emulsion prepared above using a magnetic stirrer and Teflon coated stirring bar.

An oil-in-water-in-oil emulsion is formed as described in Example 1, except that 0.04 ml. of glacial acetic acid is used and mixing is continued for two minutes after the acid addition.

When analyzed as in Example 1, the microspheres are found to be well formed-spheres having an average diameter from $10\mu$ to $15\mu$. The opacity of the microspheres upon heating indicates the presence of vesicles from $0.1\mu$ to $1.0\mu$ in diameter.

EXAMPLE 9

The procedure of Example 1 is followed except that three grams of a commercially available titanium dioxide pigment, sold by Du Pont under the name TiPure R-900, and 2.5 ml of the octylphenoxy polyethoxy ethanol described in Example 1 are mixed with 30 ml of the diluted sodium silicate solution by ultrasonication and the first oil phase contains 4 ml of the oil-in-water emulsifying agent described in Example 1.

The resulting vesiculated silica microspheres containing $TiO_2$ have an average diameter of about $15\mu$. The microspheres develop additional opacity upon heating. Under a scanning electron microscopy, the microspheres appear slightly irregular in shape and exhibit textured surfaces. A fractured sample of the microspheres shows entrained titanium dioxide particles and an average vesicle diameter of about $1\mu$.

EXAMPLE 10

The procedure of Example 1 is followed except that the first oil phase is prepared by dispersing six grams of the titanium dioxide pigment described in Example 9 and 4 ml. of the oil-in-water emulsifying agent described in Example 1 in 25 ml. of the paraffinic solvent described in Example 2 and 2 ml. of a lyophilic ethoxylated alcohol (a nonionic emulsifying agent sold by Du Pont under the name Merpol OA).

The resulting vesiculated silica microspheres containing $TiO_2$ are nonuniformly sized microspheres having an average diameter of about $50\mu$.

What is claimed is:

1. Vesiculated silica microspheres consisting essentially of from 0 to 90% by weight of pigment, based on the total weight of the microspheres, and from 10 to 100% by weight of silica, based on the total weight of the microspheres, the microspheres, having an average diameter from $0.5\mu$ to $50\mu$, the average diameter of the vesicles being $0.1\mu$ to less than $50\mu$ and the volume of the vesicles being from 5 to 95% of the total volume of the microspheres, wherein the vesicles are substantially discrete and spheroidal.

2. Vesiculated silica microspheres according to claim 1 wherein the average diameter of the vesicles is from $0.1\mu$ to $1.0\mu$.

3. Vesiculated silica microspheres according to claim 1 wherein the volume of the vesicles is from 10 to 80% of the total volume of the microspheres.

4. Vesiculated silica microspheres according to claim 1 wherein the surface of the microspheres is substantially continuous.

5. Vesiculated silica microspheres according to claim 1 wherein the pigment is selected from the group consisting of titanium dioxide, white lead, zinc oxide, zinc sulfide and carbon black.

6. Vesiculated silica microspheres according to claim 5 wherein the pigment is rutile titanium dioxide.

7. Process for preparing vesiculated silica microspheres by the steps of
   i. forming an oil-in-water emulsion by contacting a siliceous aqueous phase with a first oil phase,
   said siliceous aqueous phase composed of water and at least one silicon compound selected from the group consisting of colloidal silica and alkali metal silicates,
   said first oil phase composed of at least one water-immiscible hydrocarbon selected from the group consisting of liquid and low melting aliphatic and aromatic hydrocarbons,
   distributed in at least one of said phases is at least one oil-in-water emulsifying agent,
   ii. forming an oil-in-water-in-oil emulsion by contacting the oil-in-water emulsion formed in Step (i) with a second oil phase,
   said second oil phase composed of a nonionic water-in-oil emulsifying agent and at least one waterimmiscible hydrocarbon selected from the group consisting of aliphatic, aromatic and chlorinated hydrocarbons,
   iii. adding acid to the oil-in-water-in-oil emulsion formed in Step (ii), said acid being added in an amount from 0.5 to 2.0 times the amount of said acid needed to react stoichiometrically with the total amount of base present in the siliceous aqueous phase of Step (i) to gel the siliceous aqueous phase and form a slurry of vesiculated silica microspheres, and
   iv. separating the vesiculated silica microspheres from the slurry formed in Step (iii).

8. Process for preparing vesiculated silica microspheres according to claim 7 comprising the additional steps
   v. dispersing the vesiculated silica microspheres in an aqueous or alcoholic solution of a hydrophilic surfactant,
   vi. separating the vesiculated silica microspheres from the solution of surfactant, and
   vii. washing the vesiculated silica microspheres with water or alcohol.

9. Process for preparing vesiculated silica microspheres according to claim 8 comprising the additional step of
   viii. drying the vesiculated silica microspheres of Step (vii).

10. Process for preparing vesiculated silica microspheres according to claim 7 wherein in Step (i) the amount of silica in the siliceous aqueous phase is from 5 to 40% by weight, calculated as $SiO_2$ and based on the total weight of the siliceous aqueous phase.

11. Process for preparing vesiculated silica microspheres according to claim 7 wherein in Step (i) the ratio of the total volume of the first oil phase to the total volume of the siliceous aqueous phase is from 1:10 to 1:1.

12. Process for preparing vesiculated silica microspheres according to claim 7 wherein in Step (ii) the ratio of the total volume of the water-in-oil emulsion to the total volume of the second oil phase is from 1:6 to 1:1.

* * * * *